(12) United States Patent
Cao et al.

(10) Patent No.: US 7,962,357 B2
(45) Date of Patent: Jun. 14, 2011

(54) SYSTEM AND METHOD FOR CALCULATING POTENTIAL MAXIMAL PRICE AND SHARE RATE

(75) Inventors: Rong Z. Cao, Beijing (CN); Wei Ding, Beijing (CN); Shun Jiang, Beijing (CN); Juhnyoung Lee, Yorktown Heights, NY (US); Gregory C. Morris, Beacon Hill (AU); Chunhua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/040,481

(22) Filed: Feb. 29, 2008

(65) Prior Publication Data

US 2009/0222311 A1    Sep. 3, 2009

(51) Int. Cl.
*G06F 17/30* (2006.01)
*G07G 1/00* (2006.01)
*G06Q 10/00* (2006.01)
*G06F 17/00* (2006.01)
*G06G 7/00* (2006.01)

(52) U.S. Cl. ........ 705/7.35; 705/300; 705/306; 705/400

(58) Field of Classification Search .................. None
See application file for complete search history.

(56) References Cited

U.S. PATENT DOCUMENTS

| | | | |
|---|---|---|---|
| 5,987,425 A | 11/1999 | Hartman et al. | |
| 6,226,625 B1 | 5/2001 | Levenstein | |
| 6,381,586 B1 | 4/2002 | Glasserman et al. | |
| 6,526,387 B1 * | 2/2003 | Ruffin et al. | 705/7 |
| 6,526,392 B1 | 2/2003 | Dietrich et al. | |
| 6,703,934 B1 | 3/2004 | Nijman et al. | |
| 6,938,007 B1 | 8/2005 | Iulianello et al. | |
| 6,963,854 B1 | 11/2005 | Boyd et al. | |
| 6,993,494 B1 | 1/2006 | Boushy et al. | |
| 7,092,918 B1 | 8/2006 | Delurgio et al. | |
| 7,133,848 B2 | 11/2006 | Phillips et al. | |
| 7,188,069 B2 | 3/2007 | Hagelin | |
| 7,212,998 B1 | 5/2007 | Muller et al. | |
| 7,213,754 B2 | 5/2007 | Eglen et al. | |
| 7,379,890 B2 | 5/2008 | Myr et al. | |
| 7,493,262 B2 | 2/2009 | Hagelin | |
| 7,680,686 B2 | 3/2010 | Tellefsen et al. | |
| 2001/0051932 A1 | 12/2001 | Srinivasan et al. | |
| 2002/0077835 A1 | 6/2002 | Hagelin | |
| 2002/0143681 A1 | 10/2002 | Yen et al. | |
| 2002/0165834 A1 | 11/2002 | Delurgio et al. | |

(Continued)

FOREIGN PATENT DOCUMENTS

CA    2317332    10/2001

*Primary Examiner* — John W Hayes
*Assistant Examiner* — George Chen
(74) *Attorney, Agent, or Firm* — Scully, Scott, Murphy & Presser, P.C.; William Stock, Esq.

(57) ABSTRACT

System and method for determining maximal price for projects are provided. A project scope of a project based on a plurality of selected criteria is defined, and total cost of the project is estimated. A value model of the project is generated and estimated value of the project is determined using the value model. A composite object function that includes cumulative distributive functions of the total cost and of the estimated value is computed to determine potential maximal price or share rate or combinations thereof.

25 Claims, 10 Drawing Sheets

$$\max \left(C(P)\right)^k \left(1-R(P)\right) = \left(\int_{-\infty}^{P} C(x)dx\right)^k \cdot \int_{P}^{\infty} R(x)dx$$

- COMPARISON INDICATOR
(DIFFERENTIATION PREMIUM):

- U: URGENT, [0,1]
- I: IMPORTANT [0,1]
- R: REPUTATION, [-1,1]
- C: COMMITMENT, [-1,1]

$$k = \frac{2+(R+C)}{4-2(U+I)}$$

U.S. PATENT DOCUMENTS

| | | |
|---|---|---|
| 2002/0188576 A1 | 12/2002 | Peterson et al. |
| 2003/0023567 A1 | 1/2003 | Berkovitz et al. |
| 2003/0046203 A1 | 3/2003 | Ichihari et al. |
| 2003/0101146 A1 | 5/2003 | Yeo et al. |
| 2003/0171990 A1 | 9/2003 | Rao et al. |
| 2003/0177056 A1 * | 9/2003 | Winther .................. 705/10 |
| 2003/0225593 A1 | 12/2003 | Ternoey et al. |
| 2004/0073505 A1 | 4/2004 | Wright |
| 2004/0215522 A1 | 10/2004 | Eder |
| 2005/0096963 A1 | 5/2005 | Myr et al. |
| 2005/0131791 A1 | 6/2005 | MacMillan et al. |
| 2005/0256778 A1 | 11/2005 | Boyd et al. |
| 2006/0117317 A1 | 6/2006 | Crawford et al. |
| 2006/0122879 A1 | 6/2006 | O'Kelley |
| 2006/0195345 A1 | 8/2006 | Close et al. |
| 2006/0247998 A1 | 11/2006 | Gopalakrishnan |
| 2007/0143171 A1 | 6/2007 | Boyd et al. |
| 2007/0214025 A1 | 9/2007 | Jang et al. |
| 2008/0154651 A1 | 6/2008 | Kenefick et al. |
| 2008/0235076 A1 | 9/2008 | Cereghini et al. |
| 2008/0235155 A1 | 9/2008 | Thywissen |
| 2008/0312979 A1 | 12/2008 | Lee et al. |
| 2009/0006118 A1 | 1/2009 | Pollak |
| 2009/0037349 A1 | 2/2009 | Katz et al. |
| 2009/0063367 A1 | 3/2009 | Brown et al. |
| 2009/0063369 A1 | 3/2009 | Brown et al. |
| 2009/0144141 A1 | 6/2009 | Dominowska et al. |
| 2009/0210711 A1 | 8/2009 | Moskowitz |

* cited by examiner $$\max \left(C(P)\right)^k (1-R(P)) = \left(\int_{-\infty}^{P} C(x)dx\right)^k \cdot \int_{P}^{\infty} R(x)dx$$

- COMPARISON INDICATOR
(DIFFERENTIATION PREMIUM):

- U: URGENT, [0,1]
- I: IMPORTANT [0,1]
- R: REPUTATION, [-1,1]
- C: COMMITMENT, [-1,1]

$$k = \frac{2+(R+C)}{4-2(U+I)}$$

FIG. 9

- R: REVENUE (VALUE FOR SERVICE COMSUMER: 4 MILLION USD
- C: COST FOR SERVICE PROVIDER: 1 MILLION USD
- U: URGENT, [0,1]: 1
- I: IMPORTANT, [0,1]: 1
- R: REPUTATION, [-1, 1]: 0.5
- C: COMMITMENT, [-1, 1]: 0.5

$$\max (P-C)^2 (R-P)$$

$P^* = \frac{2R+C}{3}$ = 3 MILLION

1002

- R: REVENUE (VALUE FOR SERVICE COMSUMER: 4 MILLION USD
- C: COST FOR SERVICE PROVIDER: 1 MILLION USD
- U: URGENT, [0,1]: 0.5
- I: IMPORTANT, [0,1]: 0.5
- R: REPUTATION, [-1, 1]: 0
- C: COMMITMENT, [-1, 1]: 0

$$\max (P-C)^2 (R-P)$$

$P^* = \frac{R+C}{2}$ = 2.5 MILLION

SYSTEM AND METHOD FOR CALCULATING POTENTIAL MAXIMAL PRICE AND SHARE RATE

CROSS-REFERENCE TO RELATED APPLICATIONS

This application is related to the following commonly-owned, co-pending United States Patent Applications filed on even date herewith, the entire contents and disclosure of each of which is expressly incorporated by reference herein as if fully set forth herein. U.S. patent application Ser. No. 12/040,579, for "SYSTEM AND METHOD FOR COMPOSITE PRICING OF SERVICES TO PROVIDE OPTIMAL BILL SCHEDULE"; U.S. patent application Ser. No. 12/040,595, for "SYSTEM AND METHOD FOR GENERATING OPTIMAL BILL/PAYMENT SCHEDULE"; U.S. patent application Ser. No. 12/040,472, for "SYSTEM AND METHOD FOR CALCULATING PIECEWISE PRICE AND INCENTIVE".

FIELD OF THE INVENTION

The present application generally relates to pricing of services, and more particularly to maximizing profitability by estimating both cost and business value of projects.

BACKGROUND OF THE INVENTION

Buyers and suppliers of information technology (IT) services today work with a variety of different pricing schemes to meet their individual project and business needs. Historically, the great majority of service contracts were billed on a time and materials basis. However, a recent market and business survey revealed that users and vendors are increasingly moving toward more flexible contract structures built around a combination of fixed-fee/fixed-bid service components and value-based/risk-reward mechanisms based on usage or defined service-level objectives.

Common approaches to pricing include cost-oriented pricing, competitive-oriented pricing, and value-based pricing approaches. In cost-oriented pricing, the seller determines the cost involved in providing a specific service and adds the desired profit margin to calculate price. The cost is set based on the internal cost to deliver the service and/or product plus a target margin on the cost. In competitive-oriented pricing, price is determined with reference to the prices of the competitors.

Value based pricing usually refers to the setting of price as a function of the expected value to be derived from the services and/or products. A set of value drivers in value-based pricing may vary from industry to industry. In a value based approach the price is based on the total value delivered to the client. Internal costs and target margins are only considered to ensure that the value-based price meets or exceeds the planned target margin. Value based pricing can provide greater negotiating leverage and ability to win the contract for services and/or products, and typically results in the higher profit margins. Thus, more and more projects are using value-based pricing model.

Different value-based pricing models focus on different aspects for providing value-based pricing. For instance, part fixed/part risk-reward pricing model is a form of value-based pricing models that links the price to clearly defined business value improvements, for example, economic value to the customer for the goods/services that is provided. This economic value can be measured in additional revenue, cost savings, improved cash flow, inventory turns, etc. The following formulas illustrate some examples of determining value-based price using economic values:

Base Fee+gain sharing on cost savings (e.g., –10% cost savings every year for 3 years);

Base Fee+gain sharing on completion date (e.g., +/–10% depending on defined implementation date);

Base Fee+gain sharing on added value (e.g., link price to efficiency business process improvement);

Base Fee+gain sharing on company level metrics (e.g., link price to corporate level metrics such as ROCE (Return on Capital Employed), ROA (Return on Assets); share price improvement of the client; KPIs (Key Performance Indicators) specified in balanced scorecard, meeting schedule, budget, and/or quality in project delivery; building capability in process and/or technology platform; client satisfaction).

Another example of value-based pricing model is self-funding pricing model. This model considers risks based on phased funding upon attainment of benefits. For example, first phase of work is funded based on the successful attainment of benefit for the next phases of work. Solution financing model provides yet another variation of value-based pricing model that includes complete or partial financing of an appropriate solution. Completely variable pricing is another value-based pricing model and links the price to clearly defined business value improvements and covers the entire project fee plus potential gain sharing based on some metrics. Utility/on-demand pricing is yet another example of value-based pricing model, in the form of "usage-based" feed, that is, price depending on usage of services, outsourced process performance, IT infrastructure usage.

While many IT services firms utilize the value-based pricing models, others have varied pricing determination depending on the state of client's business goals and individual projects. For instance, if client's underlying business goals and maturity of its internal processes are small and have poorly scoped engagements, time and materials pricing is seen as the appropriate pricing model. On the other hand, if the client has well defined projects drawn from previous project experience, fixed-fee pricing is viewed as more appropriate. Among trusted partners, where the responsibilities of each player are clear and agreeable, value-based pricing is preferred since outstanding results can be delivered if done properly.

In practicality, deals may incorporate a variety of components and situations resulting in a hybrid deal structure. Thus, it is desirable to have an automated system and method that can take into account the various and hybrid characteristics of a project or business goal and provide an optimal pricing model, for example, that is based on different pricing models for different sets of characteristics found in the overall project or business goal.

Profitability can be extremely sensitive to changes in price. For instance, studies show that given a cost structure typical of large corporations, a 1% boost in price realization yields a net income gain of 12%. A pricing model that considers hybrid characteristics of a project and uses different pricing schemes and further optimizes the ratio of the usage of those different pricing schemes in the pricing model would provide better and more accurate pricing and result in much improved profit. A method and system for determining potential maximal price and/or share rate, which for example may be used in generating and/or using such pricing models are also desirable.

BRIEF SUMMARY OF THE INVENTION

A method and system for determining potential maximal price and/or share rate are provided. The method in one aspect may comprise defining a project scope of a project based on a plurality of selected criteria and estimating total cost of the project based on the project scope. The method may further include generating a value model of the project and determining an estimated value of the project using the value model. The method may also include computing a composite objective function, the composite objective function including a cumulative distributive functions of the total cost and of the estimated value to determine potential maximal price or share rate or combinations thereof.

A system for determining potential maximal price and/or share rate, in one aspect, may comprise a project cost estimator module operable to execute in a processor and further operable to define a project scope of a project based on a plurality of selected criteria. The project cost estimator module may be further operable to estimate total cost of the project based on the project scope. A business value assessor module is operable to execute in a processor and further operable to generate a value model of the project and determine an estimated value of the project using the value model. A maximal price calculator module is operable to compute a composite objective function. The composite objective function may include cumulative distributive functions of the total cost and of the estimated value. Potential maximal price or share rate or combinations thereof, may be determined using the composite object function.

A program storage device readable by a machine, tangibly embodying a program of instructions executable by the machine to perform a method of determining potential maximal price and/or share rate may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 9 illustrates potential maximal price calculation in one embodiment of the present disclosure.

FIG. 10 illustrates potential maximal price adjusted by differentiation premium in one embodiment of the present disclosure.

DETAILED DESCRIPTION

Cost-plus approach determines price based on the internal cost to deliver, plus a target margin. In a value-based approach, the price is based on the total value delivered to the client. In this approach, internal costs and target margins are viewed only to ensure that the value-based price meets or exceeds the planned target margin. Generally, value-based pricing provides greater negotiating leverage, improving both margins and win rates.

Figure 1:
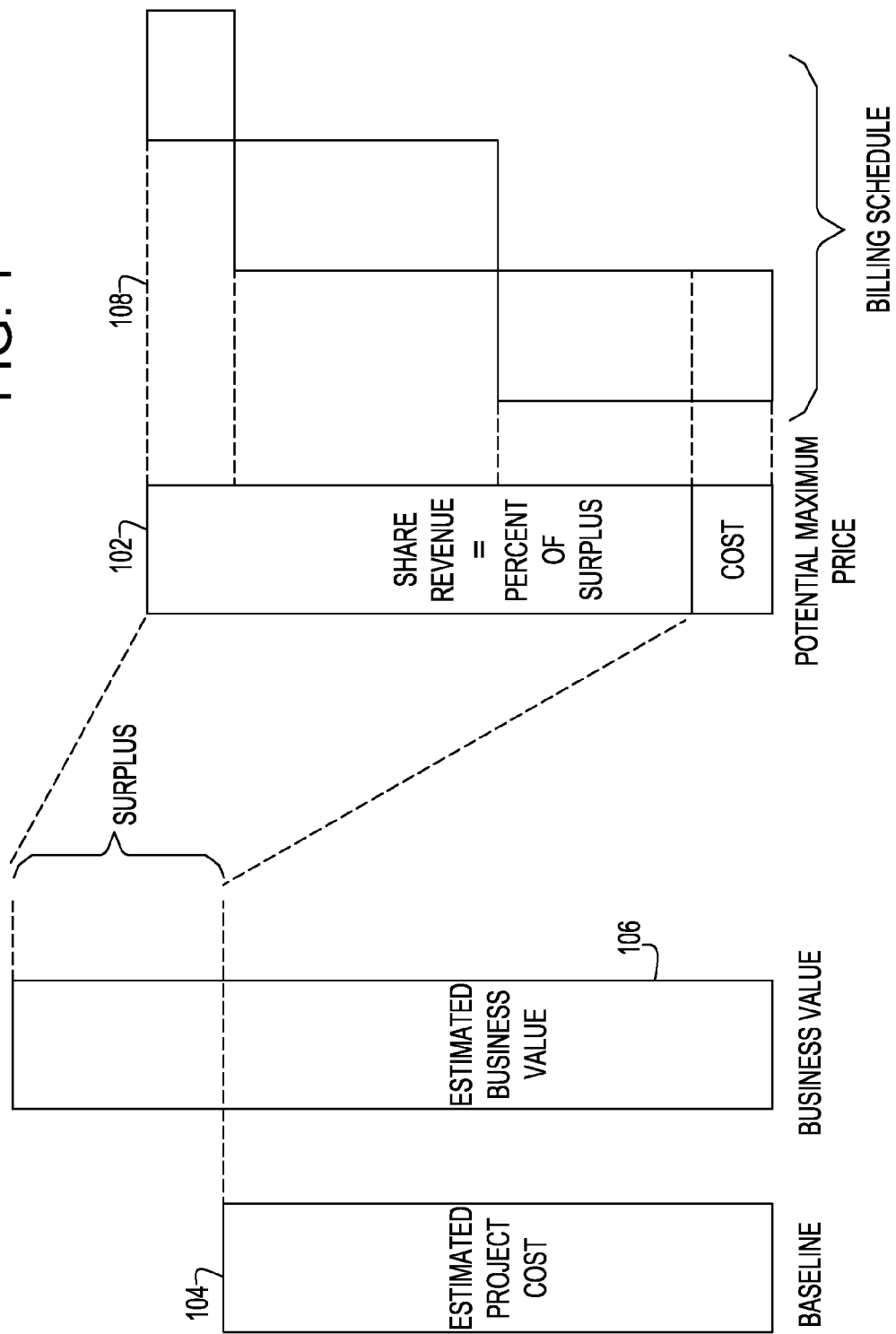
FIG. 1 illustrates analyzing potential maximum price based on baseline and surplus.

FIG. 1 illustrates analyzing potential maximum (or maximal) price based on baseline and surplus, Potential maximum price is defined as a maximum amount for which the consumer, for example, a service consumer, declares a willingness to pay, for example, for the service from a service provider. The potential maximum price is related to the surplus, which is the (estimated) business value minus the (estimated) project cost. Assuming that the client pays for the project cost, the additional charge (margin) that a service provider can charge to the client is s share of the surplus. It is assumed that in a normal situation, the client will not pay more than the value they will receive from a project. Thus, the potential maximum price is the addition of the estimated project cost and the surplus. Share rate is related to potential maximum price, in that it represents a fixed percentage share of the benefit (surplus or profit) that service consumer is willing to share with the provider. It is assumed that in a normal situation, the client will not share the entire surplus value (revenue) with the service provider. In a gain-sharing pricing model, a certain percentage of the surplus revenue will be shared between the client and the service provider. The percentage is referred to as the Share Rate. The Share Revenue is the multiplication of the Share Rate to the Surplus Revenue, that is, the portion of Surplus Revenue shared by the client with the service provider. The potential maximum price is the estimated project cost plus the Share Revenue. The potential maximum price is the "Billing Amount," which may be distributed or divided into pieces for the Billing Schedule. The Billing Schedule is an overlay of these pieces over a duration of time.

In one aspect, generation of potential maximum price 102 is based on the baseline 104 and business value 106 to the client. The baseline 104 is a measurement used as a basis for comparison, which may be the provider's average cost to provide a defined solution and/or service. The estimated business value 106 refers to the value to the client. Generally, the potential maximum price 102 ranges between the baseline 104 and the estimated business value 106. The potential maximum price outside this range may not be desirable or optimal. The billing amount is the estimated cost plus the surplus revenue times the share rate. With the Share Rate (0 to 100%), the billing amount can range from 0 to the potential maximal price. Based on the computed price or billing amount 102, a billing scheduling 108 over a desired time period may be generated.

Figure 2:
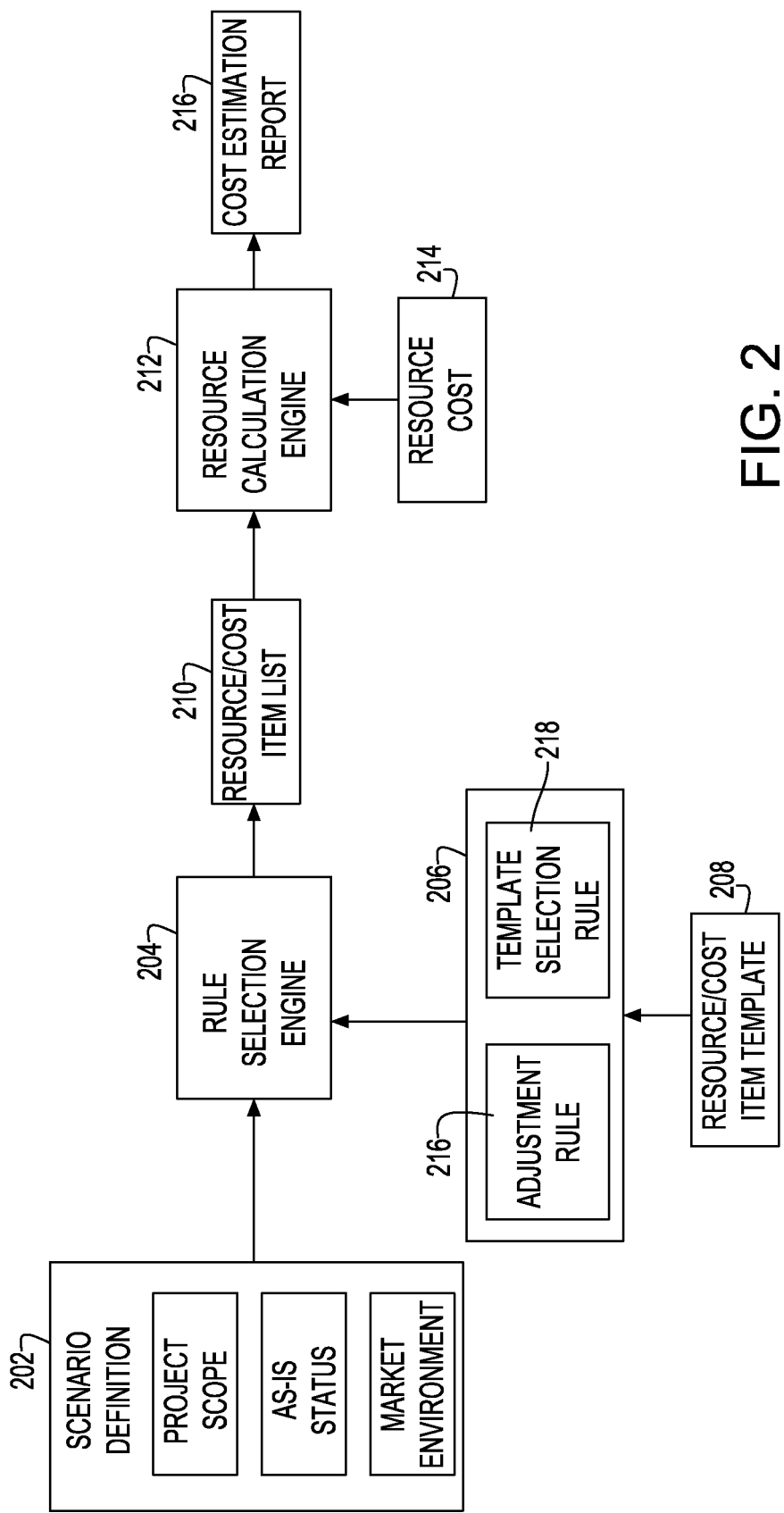
FIG. 2 illustrates estimating common cost in one embodiment of the present disclosure.

FIG. 2 illustrates estimating common cost or the baseline as described above, in one embodiment of the present disclosure. A scenario 202 is defined by using questionnaire. The questionnaire is input to the rule selection engine 204 for project scoping. In the project scoping, the heterogeneity is reflected by answers in the questionnaires, which determines the adjustments to the standard cost. This approach implies that a reusable costing method predefines and utilizes the mapping relationship between questionnaire options and adjustment parameters as rules. Then the estimated cost can be automatically generated by applying the rules, which can be further adjusted by experts. For instance, resource calculation engine 212 automatically may apply the rules selected in the rule selection engine 204 on items 210 and their resource cost 214, and generate cost estimation 216. Rules selection engine 204 selects rules based on rules 206 such as adjustments rules 216 and template selection rules 218.

Resource/cost item template 208 in one embodiment summarizes a set of best practices $\{S_i:l=1,\Lambda,L\}$ derived from previous engagement practices, which may be arranged according to project phase, application module, industry or other dimensions. Adjustment rules $\{Rule_k\}$ 216 in one embodiment provide mappings from combination of factors, for example, answer options in the questionnaire, to resource requirement parameters. That is, $Rule_k=(Condition_k,S_l,Parameter_{kl})$, whence $Condition_k=\{O_{ij}:i\in\{1,\Lambda,N\}, j\in\{1,\Lambda,M_i\}\}$ and at most only one i for a given condition, since in this example, it is assumed that in the questionnaire are single choice questions, although not necessary. $Parameter_{kl}$ is the adjustment parameter, which is usually in percentage. Resource cost template 208 in one embodiment utilizes the adjustment rules 216 expressed in a decision table, or as a general rule set in a rule engine.

Figure 3:
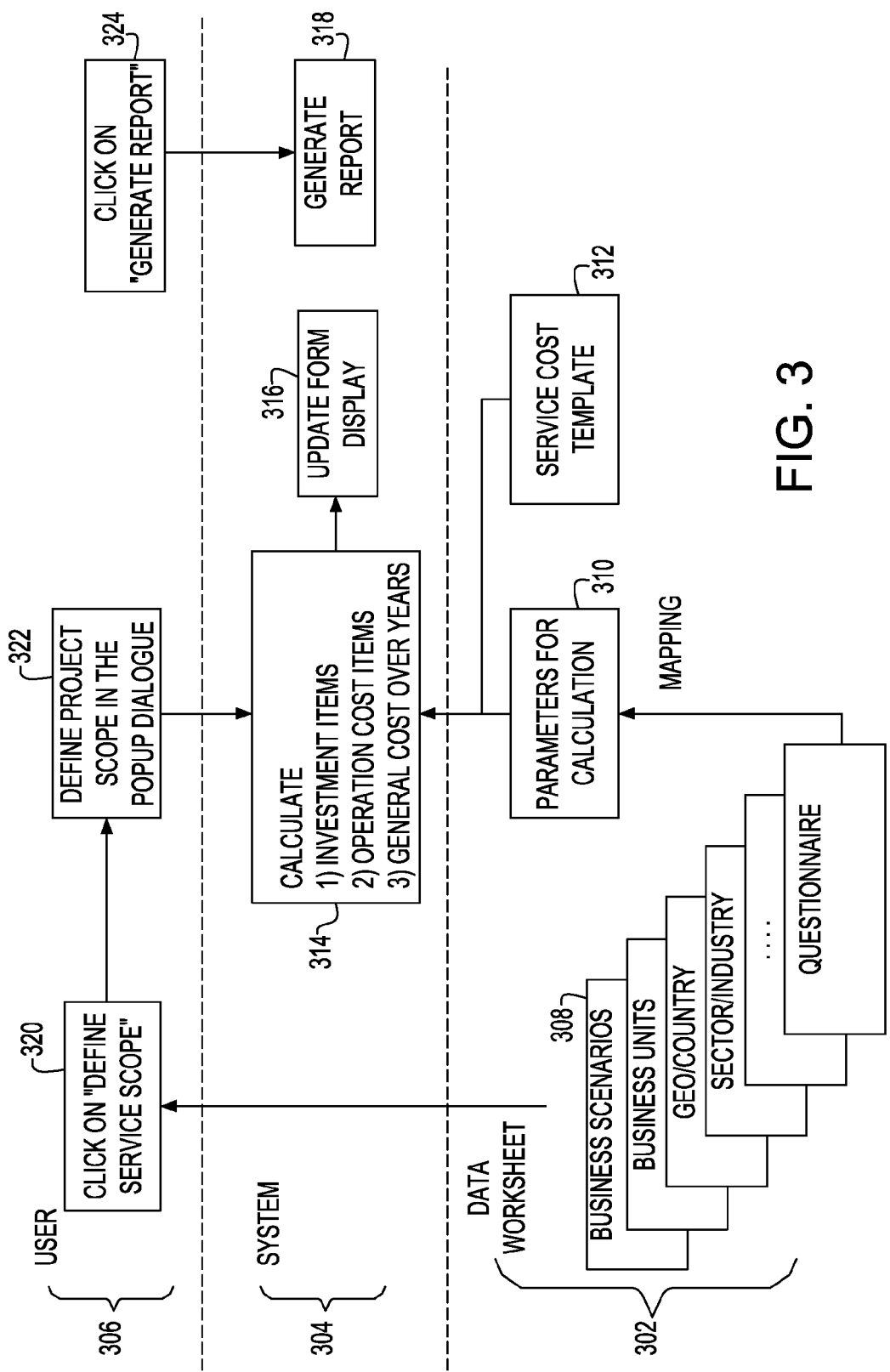
FIG. 3 illustrates architectural diagram for estimating common cost in one embodiment of the present disclosure.

FIG. 3 illustrates architectural diagram for estimating common cost in one embodiment of the present disclosure. A model of cost estimation in one embodiment is shown from three perspectives: data 302, system 304 and user interface 306. Data layer 302 may include business scenarios 308, parameter for calculation 310 and service cost template 312. The system layer 304 may use a rule engine to calculate the cost estimation as shown at 314, update one or more forms displayed to users 316 and generate report 318. From the user's perspective, a user 306 may initiate or invoke cost estimation process. For instance, a user may invoke an object or function to define service scope as shown at 320 and provide information in response to questionnaire and input data. A user also may interactively participate in project scope defining process as shown at 322. A user may further invoke an object or function to view or observe a cost estimation report as shown at 324.

Figure 4:
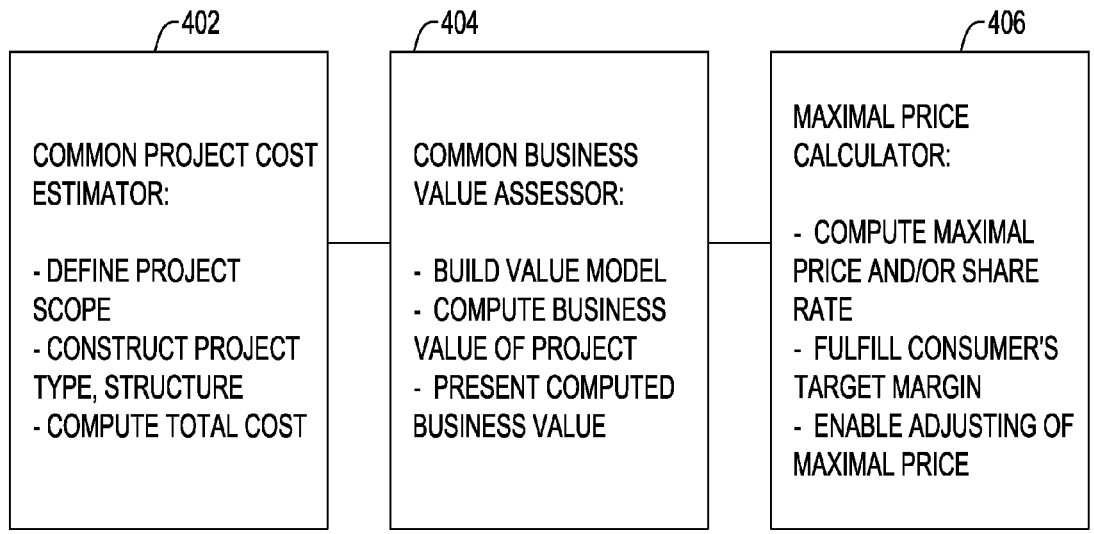
FIG. 4 illustrates functional components of the present disclosure in one embodiment.

FIG. 4 illustrates functional components of the present disclosure in one embodiment. Although not limited to the configuration shown, a system for maximizing price and/or share rate may be modularized according to the functional modules shown in FIG. 4. For example, a common project estimator module 402 may define a project scope comprising multiple dimensions such as sectors, industries, continents and countries, business units and business processes, and/or like.

Figure 11:
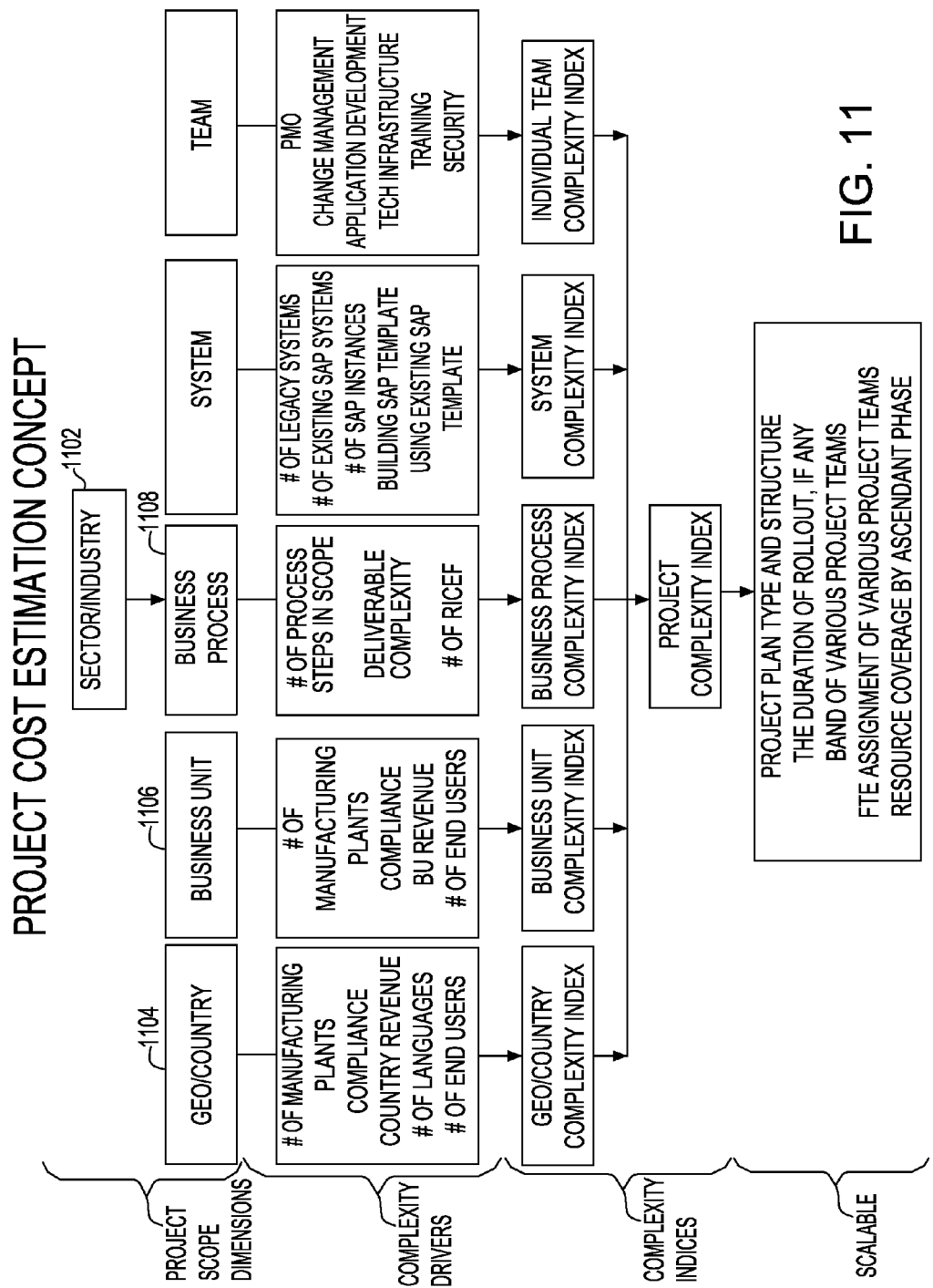
FIG. 11 shows an example of details of project scoping and complexity avers, which are used to decide the project plan type and structure and other aspects of cost estimation of a project.

The common project estimator module 402 may also construct one or more project types and/or project structure that meet various conditions such as minimizing the delivery cost and time while meeting other constraints. FIG. 11 shows an example of details of project scoping and complexity drivers, which may be used to decide the project plan type and structure and other aspects of cost estimation of a project. The project types and structures are decided by the project scoping dimensions and their complexity drivers. Examples of constructing a project structure are described below. Clients are provided with the ability to derive multi-dimensional implementation project plans for projects. The multi-dimensional implementation project plans enable flexible and cost-effective implementation of applications aligned to business strategies and environments of the client. In one embodiment of the present disclosure, the basic dimensions that are taken into account in structuring application implementation projects include sector and industry 1102, geography and country 1104, business unit 1106, and business scenario and/or process 1108, which were described in the questionnaires in the user interface. By combining these dimensions, the estimation system provides a plurality of multi-dimensional implementation project plans.

As an example for illustrative purposes, there may be a number of best-practices, (for example, 26 best-practices) or implementation project plans that are to be considered. A list of multi-dimensional implementation plans (26 combinations) may be presented to a user, for example, via a user interface. Some of the plans may be single-dimensional (e.g., By Geography, By Country, By Business Unit, and By Business Scenario), others 2-dimensional (By Geo-By Business Unit, By Geo-By Business Scenario, By Country-By Business Unit, and By Country-By Business Scenario), yet others 3-dimensional (By Geo-By Business Unit-By Business Scenario, By Geo-By Business Unit-By Business Scenario, By Country-By Business Unit-By Business Scenario, and By Country-By Business Scenario-By Business Unit). Table 1 presents a list of possible one, two, and three dimensional project plans according to an embodiment of the present disclosure. In one embodiment, the sector and industry dimension is not used in the multi-dimensional project plans, and Geo and country are not used together. In this embodiment, if a country is deemed important based on a user selected threshold, such as unit volume, or revenue, then country would be used instead of Geo (continent—a collection of countries within an area). Based on the user input collected from the form-based questionnaires, the project estimation system can calculate and present the scores of each of the multi-dimensional implementation plans in a table or form as shown in the user interface.

TABLE 1

| | |
|---|---|
| Single-Dimensional Project Plans | By Geo |
| | By Country |
| | By Business Unit |
| | By Business Scenario |
| Two-Dimensional Project Plans | By Geo, By Business Unit |
| | By Geo, By Business Scenario |
| | By Country, By Business Unit |
| | By Country, By Business Scenario |
| | By Business Unit, By Geo |
| | By Business Unit, By Country |
| | By Business Unit, By Business Scenario |
| | By Business Scenario, By Geo |
| | By Business Scenario, By Country |
| | By Business Scenario, By Business Unit |
| Three-Dimensional Project Plans | By Geo, By Business Unit, By Business Scenario |
| | By Geo, By Business Scenario, By Business Unit |
| | By Country, By Business Unit, By Business Scenario |
| | By Country, By Business Scenario, By Business Unit |
| | By Business Unit, By Geo, By Business Scenario |
| | By Business Unit, By Country, By Business Scenario |
| | By Business Unit, By Business Scenario, By Geo |
| | By Business Unit, By Business Scenario, By Country |
| | By Business Scenario, By Geo, By Business Unit |
| | By Business Scenario, By Country, By Business Unit |
| | By Business Scenario, By Business Unit, By Geo |
| | By Business Scenario, By Business Unit, By Country |

The common project estimator module 402 may then determine the total cost of project, for instance, by assigning staff and other efforts, software and hardware required, etc., to the selected project plan. In one embodiment, a mathematical model may be used to rank the feasible project plan types and to understand their behavior and patterns for selecting one or two project plans that will be used in the implementation. The calculation of the scores for each of the multi-dimensional implementation plans thus may utilize a mathematical model based on multi-attribute utility theory (MAU) with empirical data. Table 2 is an example of weightings assigned to attributes for the determination of scores for the multi-dimensional implementation plans. In the example, Geos (continents) are given a greater weighting than individual countries, since Geos already include the individual countries.

TABLE 2

| Attribute | Weight |
|---|---|
| Number of Geos (Continents) | 100 |
| Number of Countries | 25 |
| Number of Business Units | 50 |
| Number of Manufacturing Plants | 75 |
| Maximum Country Revenue | 100 |
| Maximum Business Unit Revenue | 75 |
| Business Unit Similarity Level | 50 |
| Business Process Standardization Level | 75 |

Figure 12:
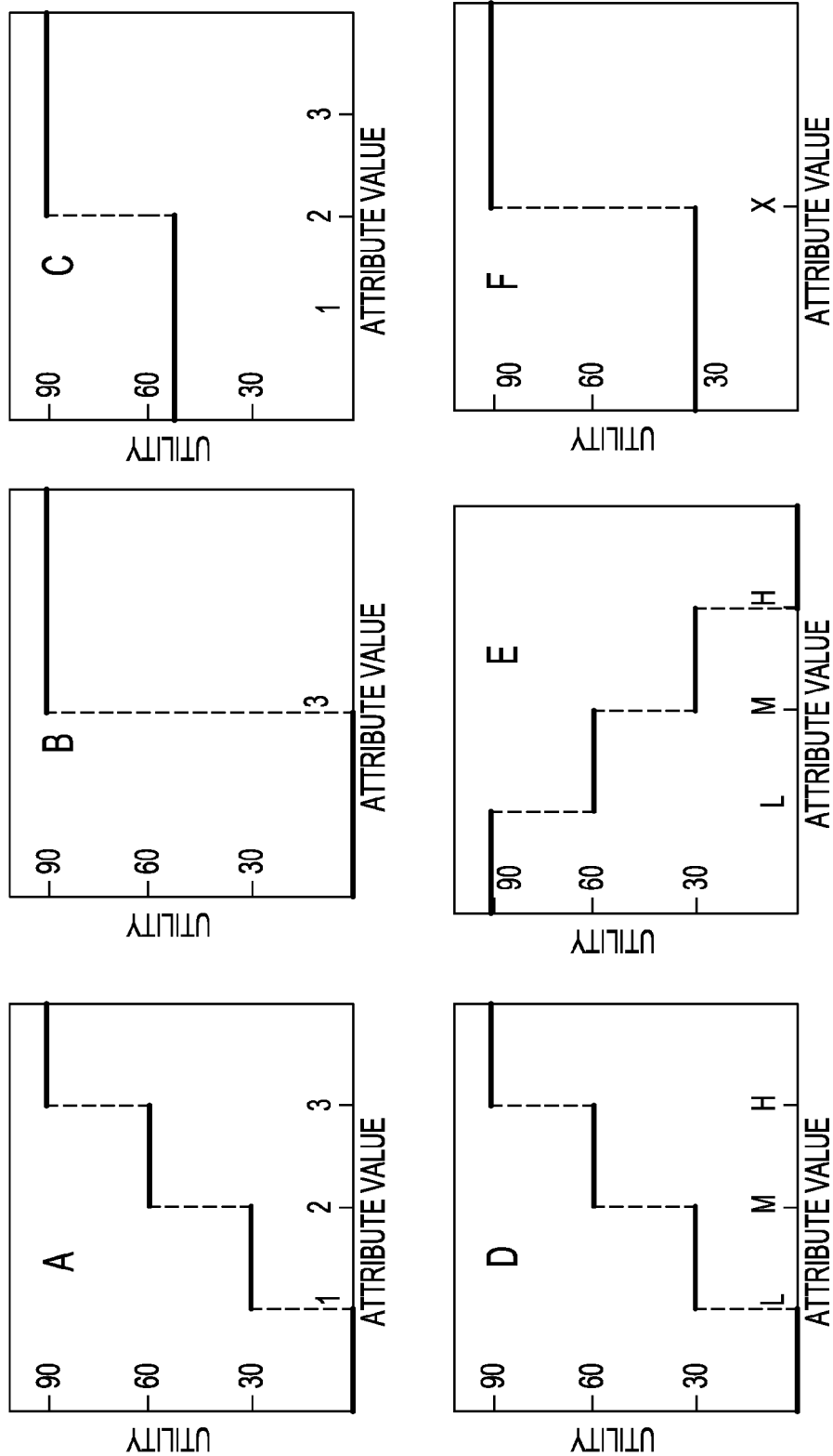
FIG. 12 provides examples of graphical representations of utility functions that are assigned to the dimensions and attributes for the determination of scores for the multi-dimensional implementation plans according to an embodiment of the present disclosure.

In one embodiment, one or more utility functions are used in constructing project type and/or structure. FIG. 12 provides examples of graphical representations of utility functions that are assigned to the dimensions and attributes for the determination of scores for the multi-dimensional implementation plans according to an embodiment of the present disclosure. Utility functions A-F are a subset or examples of 32 possible utility functions that correspond to the 4 dimensions (geo (continent), country, business unit, and business scenario) and 8 attributes (Table 2) of the example implementation shown above. The other 26 utility functions are employed with the other 3 dimensions. The number of possible utility functions is given by the equation:

Number(utility function assignment)=Number(dimensions)×Number(attributes), therefore, 32 utility function assignments=8 dimensions×4 attributes Utility function A has an x-axis with attribute values corresponding to the number of facilities located in a given continent or country. For example, if there are two facilities in a given country the utility function A has a value of 60. The utility function F represents a situation where a threshold parameter (X) determines the value for the utility function. For example if X represents a level of revenue in a given country, and the actual revenue is less than the threshold, the utility function F assumes a value of 30. Utility functions can be based on qualitative information as well, as illustrated by utility function D with attribute values based on qualitative measures such as L—low, M—medium, and H—high (which are assigned numeric values). An example of a qualitative measure based on user responses to the form-based questionnaires is the level of system integration required (low, medium, high). The utility functions may include step functions, non-linear functions, and linear functions.

Table 3 illustrates examples of the assignments of the utility functions A-F shown in FIG. 12 to the GEO dimensions and attributes.

TABLE 3

| Dimension | Attributes | Utility Function |
|---|---|---|
| Geo | Number of Geos (Continents) | A |
| Geo | Number of Countries | A |
| Geo | Number of Business Units | B |
| Geo | Number of Manufacturing Plants | C |
| Geo | Maximum Country Revenue | F |
| Geo | Maximum Business Unit Revenue | F |
| Geo | Business Unit Similarity Level | D |
| Geo | Business Process Standardization Level | E |

Table 4 is a summary of inputs for the scoring functions and ordering factors. Input parameters include:

| | |
|---|---|
| dimensions | $D_i$ |
| attributes | $A_p$ |
| weights | $W_p$ |
| utility function | $U_{ip}$ |
| ordering factors | $O_{ni}$ |

The columns headers of table 4 represent the attributes, while the row descriptors are example dimensions. At a corresponding intersection of a row and column a corresponding utility function is assigned.

TABLE 4

| | A1 | A2 | A3 | ... | Ai | ... |
|---|---|---|---|---|---|---|
| D1 (Geo) | U11 | U12 | U13 | ... | U1i | ... |
| D2 (Country) | U21 | U22 | U23 | ... | U2i | ... |
| D3 (Business Unit) | U31 | U32 | U33 | ... | U3i | ... |
| D4 (Business Scenario) | U41 | U42 | U43 | ... | U4i | ... |

The following equations are used in a multi-attribute utility mathematical model to calculate score for the various dimensional implementation project plans according to an embodiment of the invention. The ordering factors Oij (where i is the dimension of the grouping (e.g., 1—one-dimensional, 2—two-dimensional, etc.) and j varies from 1 to the number of possible grouping orders) correspond to the order in grouping the various Dimensions. For example, the value of $O_{21}$ corresponding to the two-dimensional ordering—By Geo, By Business may differ from $O_{22}$ for the two-dimensional ordering By Business, By Geo. The following score functions are an additive model.

(1) Score of a single-dimensional implementation project plan $$\text{Score}(D_i) = O_{1i} \frac{\sum_{p=1}^{m} W_p U_{ip}}{W_p}, \text{ where } Ou = \frac{3}{1}, \text{ and } i = 1, \ldots, n$$

(2) Score of a two-dimensional implementation project plan $$\text{Score}(D_i, D_j) = O_{2i} \frac{\sum_{p=1}^{m} W_p U_{ip}}{W_p} + O_{2j} \frac{\sum_{p=1}^{m} W_p U_{jp}}{W_p},$$

-continued where $O_{2i} = \frac{4}{2}, O_{2j} = \frac{2}{2}, i = 1, \ldots, n$ and $j = 1, \ldots, n$ (3) Score of a three-dimensional implementation project plan $$\text{Score}(D_i, D_j, D_k) = O_{3i}\frac{\sum_{p=1}^{m} W_p U_{ip}}{W_p} + O_{3j}\frac{\sum_{p=1}^{m} W_p U_{jp}}{W_p} + O_{3k}\frac{\sum_{p=1}^{m} W_p U_{kp}}{W_p},$$

where $O_{3i} = \frac{4}{3}, O_{3j} = \frac{3}{3}, O_{3k} = \frac{2}{3}, i = 1, \ldots, n, j = 1, \ldots, n$
and $k = 1, \ldots, n$ The score of a single-dimensional implementation project plan may be the weight average utility value across involved attributes multiplied by the single dimensional ordering factor, which scales up the score comparable to those of multi-dimensional implementation project plans. The score of a multi-dimensional implementation project plan may be the summation of the weight average utility value across involved attributes of each dimension, multiplied by ordering factors, which normalize the resulting score comparable to those of other implementation project plans, and reflect the effect of the orders of the involved dimensions.

The above described an example method of estimating project cost for illustrative purposes. The method and system of the present disclosure, however, does not limit estimating project cost only by the method shown above. Rather, other methods may be used to estimate project cost.

Figure 5:
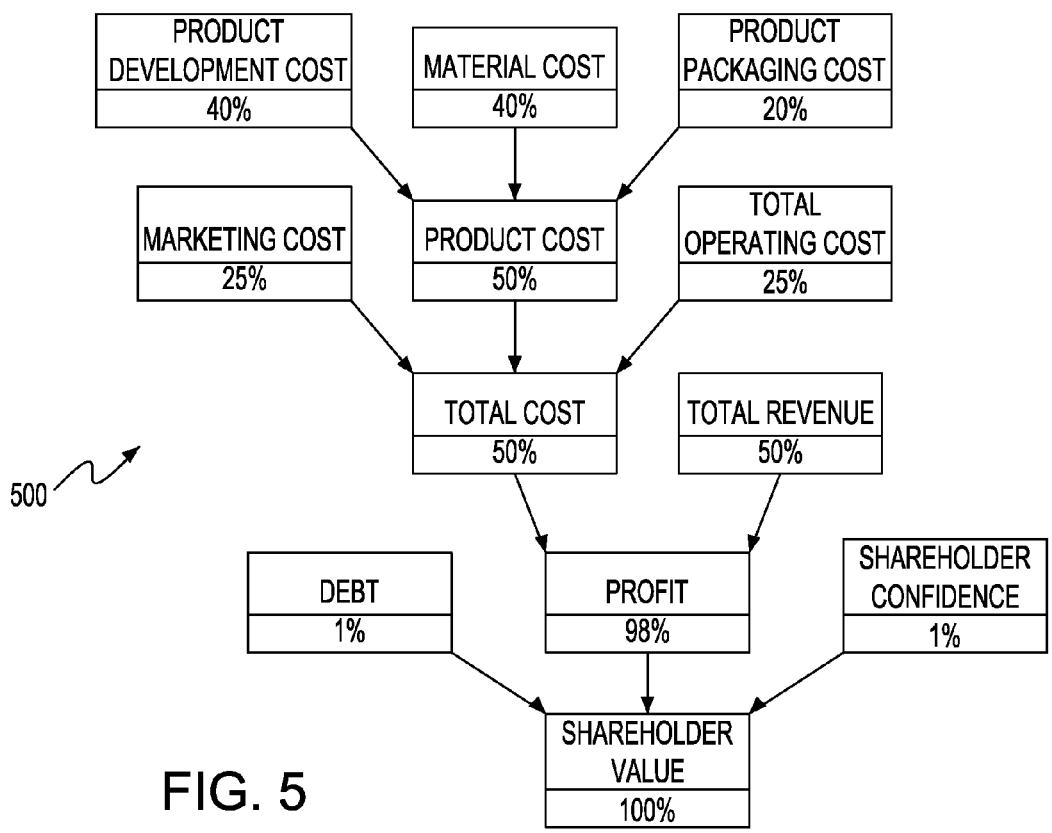
FIG. 5 illustrates an example of the value driver tree used in one embodiment for business value assessment methodology in one embodiment of the present disclosure.
Figure 6:
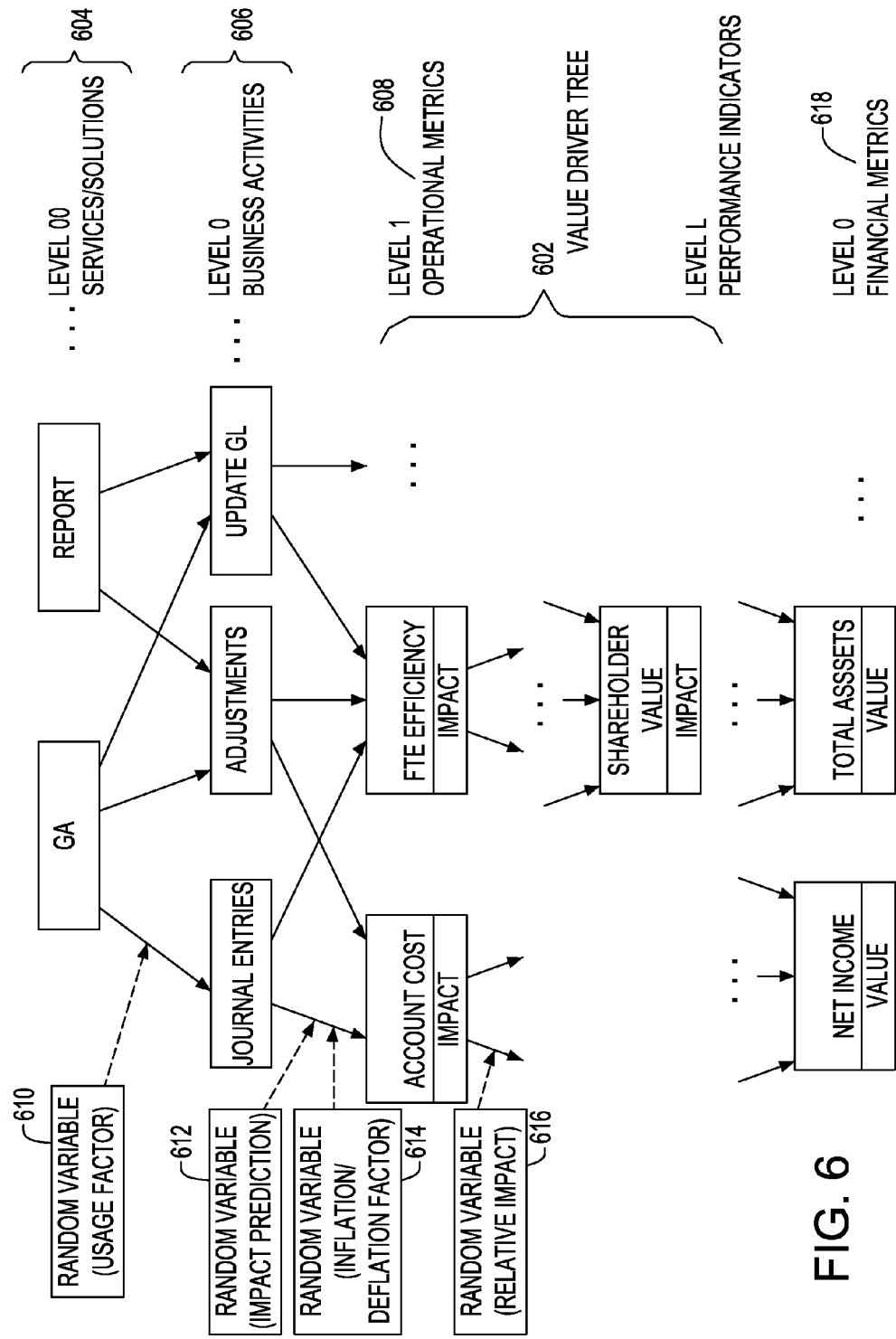
FIG. 6. illustrates a value estimation model in one embodiment of the present disclosure.

A common business value assessor module 404 builds a value model of the project, for instance, scoped in the common project estimator module. In one embodiment, the value model may be network-based. In one embodiment, a value model is a mathematical model that is used to calculate the business and/or financial values of one or more solutions and/or projects the project scoped, ranked and selected earlier. An embodiment of the value model is based on a network structure, referred to as network-based value model, which is illustrated in FIGS. 5 and 6. A value model links services and solutions with operational metrics, performance indicators and financial metrics through business activities. For example, as shown in FIG. 6, General Accounting (GA) solution model may be linked to metrics such as account cost, and FTE efficiency. The metrics may be aggregated in a network model to calculate shareholder value of one or more services and/or solutions. The common business value assessor module 404 also may calculate business value of project by using the value model and a recursive, stochastic algorithm. The calculated business value may then be presented in financial benefit metrics such as net present value (NPV), internal return rate (IRR), return on investment (ROI), payback time, etc.

A maximal price calculator module 406 may compute maximal price or share rate. In calculating the maximal price or share rate, the maximal price calculator module 406 maximizes the service provider profitability, in one embodiment, by calculating cumulative distributive functions of service provider's cost and service consumer's surplus value. The maximal price calculator module 406 further may fulfill the service consumer's target margin requirement of the project and enable adjusting the maximal price by differentiation premium.

FIG. 5 illustrates an example of the value driver tree used in one embodiment for business value assessment methodology in one embodiment of the present disclosure. A value driver is an aspect of the business that can vary up or down over time. Value drivers are associated with financial measures and operational metrics, then with one or more business activities. The effectiveness of the business activity execution affects the value drivers. Furthermore, value drivers influence each other. Often, the relationships among value drivers are represented in a graph or a tree 500. This figure illustrates how child value drivers influence their parent value drivers. Also, the extent of the influence from a child to a parent is captured by a number. The number is often referred to as weight or contributing factor. The linkage between any two nodes in the value driver tree is signified by the impact level of a child to its parent, where the impact levels of all children add up to 100%. The impact levels can be derived by mining empirical data or assigned speculative values for sensitivity analyses.

FIG. 6. illustrates a value estimation model in one embodiment of the present disclosure. The value modeling frameworks utilizes a multi-leveled value map, which extends the value driver tree, an example of which is shown in FIG. 5. A value map represents the relationships of services/solutions to business activities, operational metrics, performance indicators, and financial metrics. It represents each node by one random variable and one or more computation methods to compute their means, variances and co-variances between nodes. Also, it represents the quantitative relationship between any two nodes in tree by a value of the edge that connects the two nodes (e.g., usage factor).

A value map may comprise multiple levels. A level may represent business/IT services/solutions to be offered shown at 604 as Level 00; business activities associated with the offering shown at 606 as Level 0; operational metrics/value drivers shown at 608 as Level 1, 2, . . . , L; financial metrics shown at as Level O (output). The value modeling algorithm may recursively translate metric improvements at a lower level to those at a upper level, all the way to the financial metrics, i.e. output Level O, which, in turn, translates into a cost/benefit analysis of the services/solutions under consideration. Levels 1, 2, . . . , L, collectively, may comprise a value driver tree 602, an example of which is described with reference to FIG. 5.

Figure 7:
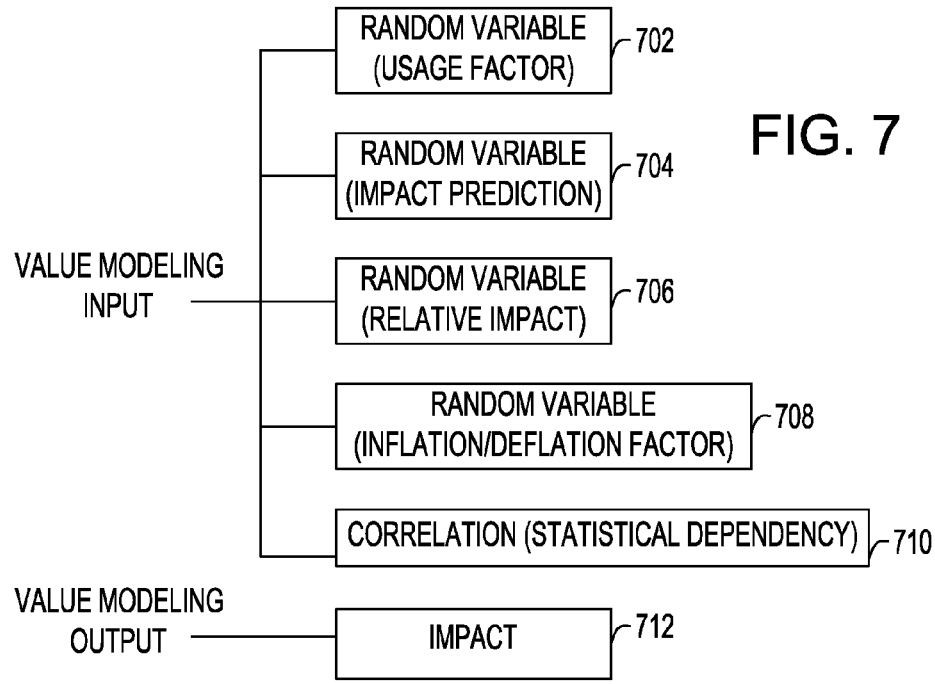
FIG. 7 illustrates input and output data for value estimation model in one embodiment of the present disclosure.

FIG. 7 illustrates input and output data for value estimation model in one embodiment of the present disclosure. An example of a value estimation model was described above with reference to FIG. 6. Input values to such a model may include, but are not limited to, random variables such as usage factor 702 (also shown in FIG. 6, 610), impact prediction 704 (also shown in FIG. 6, 612), relative impact 706 (also shown in FIG. 6, 616), inflation and/or deflation factor 708 (also shown in FIG. 6, 614), and correlation values such as statistical dependency 710. Correlation values may specify expected statistical dependency of any pair of drivers or activities. Usage factor may include expected usage factor of the solution or capability for the activity. Variables such as impact prediction may be a predicted performance improvement of the metric (or driver) as a result of performing a certain activity. Relative impact may specify an expected percentage of improvement of the parent driver due to unit improvement of the child driver. Inflation and/or deflation factor may specify an expected performance inflation or deflation effect of the driver. The input data may be in the form of single number format, most likely, minimum, and maximum format, and/or mean, range format. A user may input the data or the data may be automatically retrieved from available storage. The value estimation model may output an impact value 712, that is, an expected performance improvement of the driver, for instance, in confidence interval.

Figure 8:
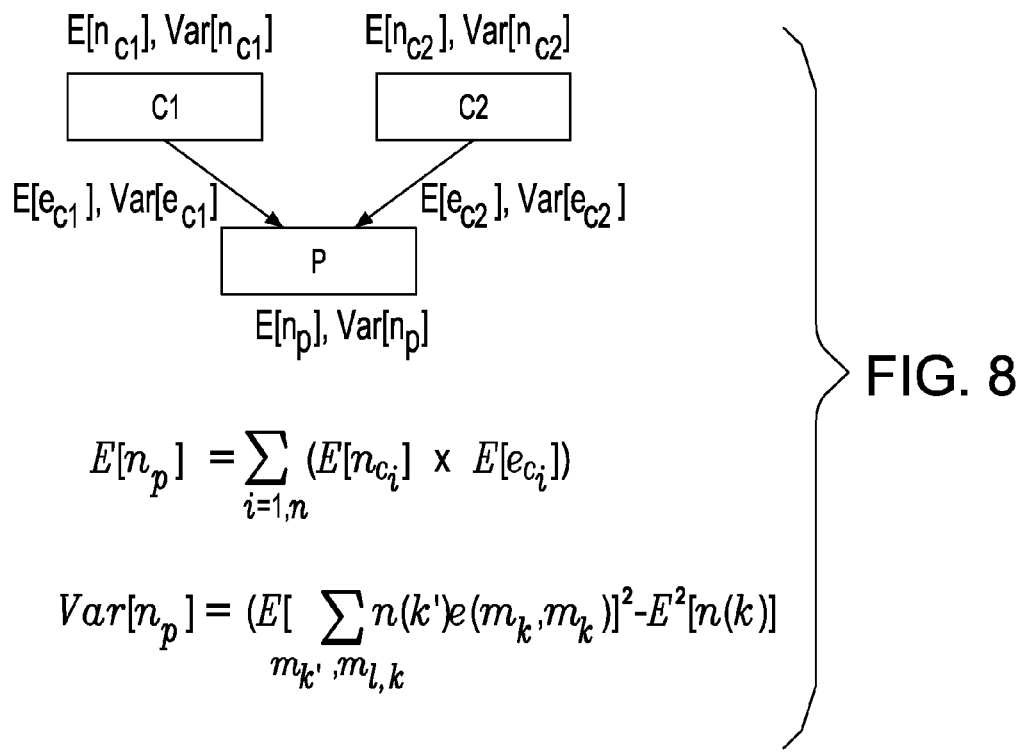
FIG. 8 illustrates a recursive value modeling algorithm in one embodiment of the present disclosure.

FIG. 8 illustrates a recursive value modeling algorithm in one embodiment of the present disclosure. The recursive value modeling algorithm calculates the expected values of a set of value drivers that are affected by the implementation of one or more services/solutions. The mean value of a node, $n_p$, in the value driver tree may be derived as follows:

$$E[n_P] = \sum_{i=1,n} (E[n_{c_i}] \times E[e_{c_i}])$$

where $E[n_{ci}]$ and $E[e_{ci}]$ are the mean of a child node n(ci) and its edge to n(p), respectively, n is the children number of np. Var[n(p)] represents the variance of the expected values.

FIG. 9 illustrates potential maximal price calculation in one embodiment of the present disclosure. Assume R(p) is a cumulative distribution function for service consumer's estimated business value, and C(p) is a cumulative distribution function for service provider's cost, i.e. baseline. An objective of service provider may be to maximize the probability that baseline is less than price, that is:

$$\max C(P) = \int_{-\infty}^{P} c(x)\, dx$$

An objective of service consumer may be to maximize the probability that estimated business value is bigger than price, that is:

$$\max 1 - R(P) = \int_{P}^{\infty} r(x)\, dx$$

Considering both service provider and service consumer's preference, the composite optimization objective may be:

$$\max(C(P))^k (1 - R(P)) = \left( \int_{-\infty}^{P} C(x)\, dx \right)^k \cdot \int_{P}^{\infty} R(x)\, dx$$

where k is an indicator, which means the utility comparison between the service provider and consumer. The bigger the value of k, the more weight given to the objective of the service provider. Different models to calculate k may be utilized. An example of indicator k includes four components and is calculated from:

$$k = \frac{2 + (R + C)}{4 - 2(U + I)}$$

where,

U is distributed in [0, 1], which represents the quality or condition of being urgent or pressing importance to the service consumer;

I is distributed in [0, 1], which represents the quality or condition of being important or significance to the service consumer;

R is distributed in [−1, 1], which represents reputation, the opinion (more technically, a social evaluation) of the public toward the service provider;

C is distributed in [−1, 1], which represents commitment, pledged by the service provider.

FIG. 10 illustrates potential maximal price adjusted by differentiation premium in one embodiment of the present disclosure. Two examples 1002, 1004 are shown that use the optimization model example shown in FIG. 9 to calculate the potential maximal price.

Figure 13:
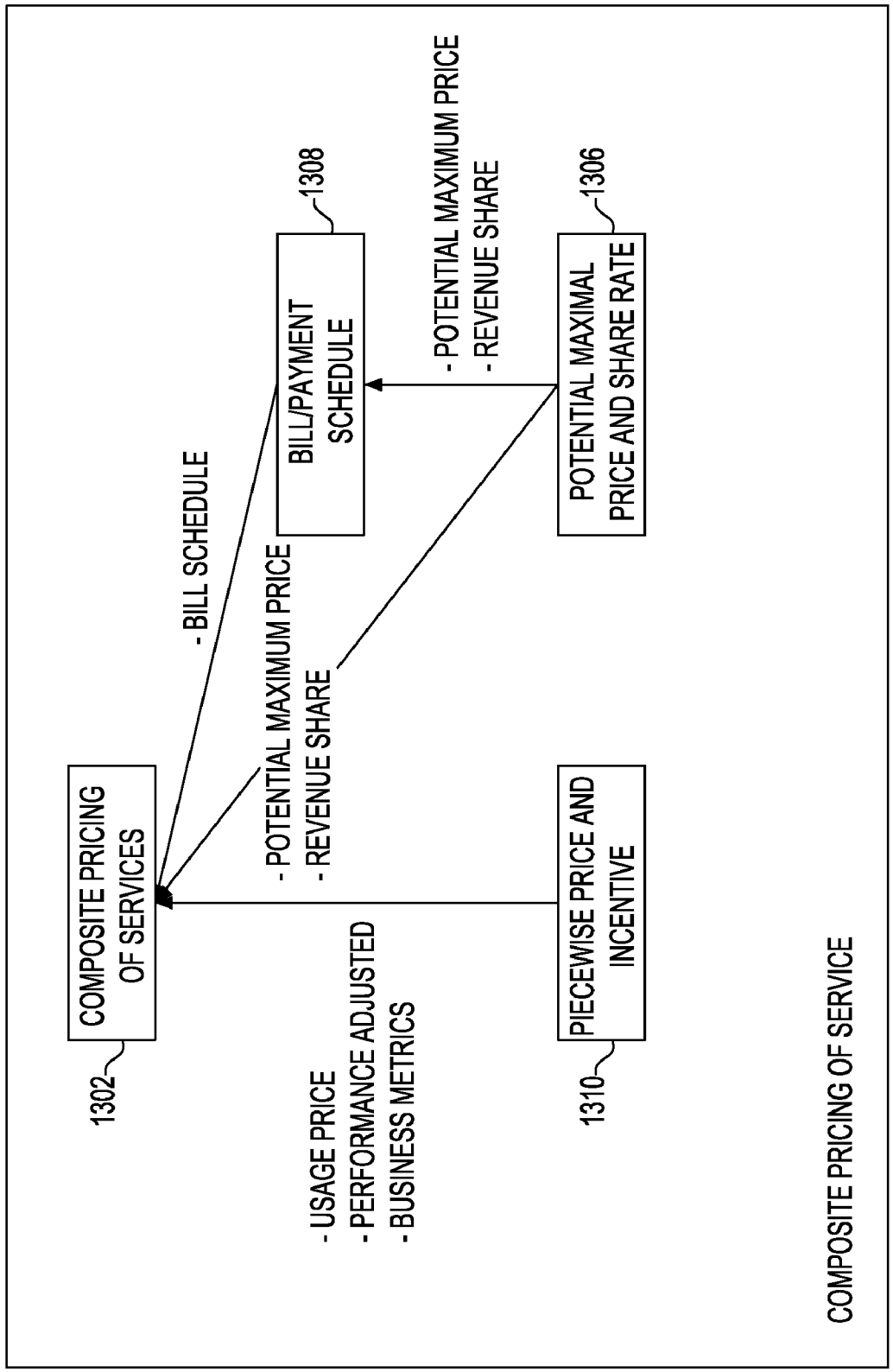
FIG. 13 illustrates an overview diagram of using potential maximal price generated according to the present disclosure in one embodiment.

Potential maximal price generated according to the present disclosure in one embodiment may be used as input for the bill scheduler disclosed in U.S. patent application Ser. No. 12/040,579 and piecewise pricing disclosed in U.S. patent application Ser. No. 12/040,472. For instance, FIG. 13 illustrates an overview diagram of using potential maximal price generated according to the present disclosure in one embodiment. Composite pricing of services 1302 may use potential maximal price and/or share rate 1306 to model or generate an optimal composite pricing model. Thus, for instance, in one embodiment the system of the composite pricing services 1302 may be connected to and communicate with the system of the present disclosure for generating potential maximal price and/or share rate. A composite pricing model builder in 1302 may automatically retrieve or receive data from the potential maximal price and/or share rate generator in 1306 for use in building a composite pricing model. Bill payment scheduler 1308 may schedule payments of potential maximal price and share rate 1306 according to the selected criteria such as client budget and payment terms.

The method of the present disclosure in one embodiment may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims. For example, while the potential maximal price and share rate were described in terms of services, it should be understood that the system and method of the present disclosure also apply to goods, products, etc. or like.

We claim:

1. A computer-implemented method for determining potential maximal price and/or share rate, comprising:

defining a project scope of a project based on a plurality of selected criteria;

estimating total cost of the project based on the project scope;

generating a value model of the project;

determining an estimated value of the project using the value model;

computing a composite objective function to determine potential maximal price or share rate or combinations thereof, wherein the composite objective function includes maximizing $(C(P))^K (1-R(P))$, where $C(P)$ is a probability that the total cost is less than the potential maximal price, $(1-R(P))$ is a probability that the estimated value is larger than the potential maximal price, and K is an indicator that indicates a utility comparison between a service provider and a consumer.

2. The method of claim 1, wherein the step of defining a project scope includes constructing a plurality of project plans comprising multiple dimensions and selecting one or more project plans for implementation.

3. The method of claim 2, wherein the plurality of project plans are constructed to meet one or more selected criteria.

4. The method of claim 3, wherein said one or more selected criteria include minimizing delivery cost, minimizing time, or one or more constraints, or combinations thereof.

5. The method of claim 2, further including using a mathematical model to rank said plurality of project plans.

6. The method of claim 1, wherein the project scope comprises a plurality of dimensions.

7. The method of claim 6, wherein the plurality of dimensions includes sectors, industries, continents, countries, business units, or business processes, or combinations thereof.

8. The method of claim 1, further including:

presenting said value of the project in financial benefit metrics.

9. The method of claim 8, wherein said financial benefit metrics include net present value, internal return rate, return on investment, or payback time, or combinations thereof.

10. The method of claim 1, wherein the step of computing a composite objective function includes determining a utility comparison indicator between said total cost and said estimated value.

11. The method of claim 1, wherein the step of generating a value model includes generating a network-based value model.

12. The method of claim 1, wherein the step of estimating total cost includes determining total cost of the project by assigning staff, effort, software, or hardware or combinations thereof, needed for said project.

13. The method of claim 1, where the step of generating a value model further includes linking the value model to one or more services and solutions with operational metrics, performance indicators and financial metrics through business activities.

14. The method of claim 1, wherein the step of estimating the value of the project includes using the value model and a recursive, stochastic algorithm.

15. The method of claim 1, further including:

generating the cumulative distributive functions of the total cost and of the estimated value; and generating the composite objective function using the cumulative distributive functions of the total cost and of the estimated value.

16. A system for determining potential maximal price and/or share rate, comprising:

a processor;

a project cost estimator module operable to execute in a processor and further operable to define a project scope of a project based on a plurality of selected criteria, the project cost estimator module further operable to estimate total cost of the project based on the project scope;

a business value assessor module operable to execute in a processor and further operable to generate a value model of the project and determine an estimated value of the project using the value model; and a maximal price calculator module operable to compute a composite objective function to determine potential maximal price or share rate or combinations thereof, wherein the composite objective function includes maximizing $(C(P))^K (1-R(P))$, where $C(P)$ is a probability that the total cost is less than the potential maximal price, $(1-R(P))$ is a probability that the estimated value is larger than the potential maximal price, and K is an indicator that indicates a utility comparison between a service provider and a consumer.

17. The system of claim 16, wherein the project cost estimator module further includes a rules selection engine operable to select one or more rules for defining project scope and constructing project plan.

18. The system of claim 17, wherein the project cost estimator module further includes a resource calculation engine operable to automatically estimate total cost of the project.

19. The system of claim 16, wherein the maximal price calculator is further operable to determine a utility comparison indicator between said total cost and said estimated value.

20. The system of claim 16, further including a user interface module operable to receive input data, wherein the project cost estimator module uses the input data to define project scope and estimate total cost, the user interface module further operable to present the estimated total cost.

21. The system of claim 16, further including a storage repository operable to store data and a plurality of templates associated with the project.

22. A program storage device readable by a machine, storing a program of instructions executable by the machine to perform a method of determining potential maximal price and/or share rate, comprising:

defining a project scope of a project based on a plurality of selected criteria;

estimating total cost of the project based on the project scope;

generating a value model of the project;

determining an estimated value of the project using the value model;

computing a composite objective function to determine potential maximal price or share rate or combinations thereof, wherein the composite objective function includes maximizing $(C(P))^K (1-R(P))$, where $C(P)$ is a probability that the total cost is less than the potential maximal price, $(1-R(P))$ is a probability that the estimated value is larger than the potential maximal price, and K is an indicator that indicates a utility comparison between a service provider and a consumer.

23. The program storage device of claim 22, wherein the step of computing a composite objective function includes determining a utility comparison indicator between said total cost and said estimated value.

24. The program storage device of claim 22, wherein the step of generating a value model includes generating a network-based value model.

25. The program storage device of claim 22, wherein the project scope comprises a plurality of dimensions.

* * * * *